United States Patent [19]

Sweat

[11] 4,337,083
[45] Jun. 29, 1982

[54] NON-POLLUTING, COOLING METHOD AND HEAT RECUPERATIVE SINTERING METHOD

[75] Inventor: William T. Sweat, Salt Lake City, Utah

[73] Assignee: ASARCO Incorporated, New York, N.Y.

[21] Appl. No.: 86,880

[22] Filed: Oct. 22, 1979

[51] Int. Cl.³ .................. C22B 1/04; C22B 1/20; C26B 7/00
[52] U.S. Cl. .................................. 75/5; 34/20; 34/212; 75/8; 432/137; 432/77
[58] Field of Search .......................... 75/5-9; 432/137, 144, 152, 77; 34/212, 719, 20; 55/27

[56] References Cited

U.S. PATENT DOCUMENTS

| | | | |
|---|---|---|---|
| 2,672,412 | 3/1954 | Burrow et al. | 75/5 |
| 2,785,063 | 3/1957 | Haley et al. | 75/5 |
| 3,194,546 | 7/1965 | Schuenger et al. | 266/21 |
| 3,211,441 | 10/1965 | Miyakawa et al. | 266/21 |
| 3,399,053 | 8/1968 | Shütz et al. | 75/5 |
| 3,649,244 | 3/1972 | Cunningham | 75/5 |
| 3,704,525 | 12/1972 | Devel | 34/164 |
| 3,909,189 | 9/1975 | Ban | 432/16 |
| 3,963,481 | 6/1976 | Powers | 75/5 |
| 4,023,960 | 5/1977 | Seidal et al. | 75/5 |
| 4,065,295 | 12/1977 | Cappel et al. | 75/5 |
| 4,067,727 | 1/1978 | Cappel | 75/5 |

OTHER PUBLICATIONS

Schmidt, R., et al.; *Erzbergbau U. Metallhüttenue*, vol. 11, Only a Translation & Only of pp. 301-310, (1958).
Puecker, et al.; "Gas Recirculation in Sintering of Lead and Zinc Concentrates", Austro-Asian Institute of Mining and Metallurgy, pp. 261-284, (1958).

*Primary Examiner*—Michael L. Lewis
*Attorney, Agent, or Firm*—Kenneth A. Koch; Daniel R. Zirker

[57] ABSTRACT

A sintering machine for pulverulent ore concentrates containing sulfidic metals including an ignition zone, a sintering zone and at least two cooling zones wherein there is total recirculation of cooling gases between two cooling zones and including a recuperative heat exchanger for cooling the exhaust gas from the first cooling zone, prior to its introduction to the second cooling zone.

17 Claims, 5 Drawing Figures

NON-POLLUTING, COOLING METHOD AND HEAT RECUPERATIVE SINTERING METHOD

BACKGROUND OF THE INVENTION

The present invention relates to a method and apparatus for converting a feed material including pulverulent sulfidic metals to a cogent agglomerated mass of the corresponding metallic oxides. The agglomerated mass is suitable as the feed material to a blast furnace for the reduction of the metallic oxides and recovery of the elemental metal. Specifically, the invention provides a sintering system for sulfidic metals that operates efficiently without the emission of sulfur containing gases, i.e. sulfur dioxide, to the atmosphere and that recovers for useful purposes a significant portion of the heat generated in burning the sulfidic content of the feed material.

For many decades, metals have been recovered from ore containing the metal in sulfidic form, i.e., as metal sulfates and sulfides, by grinding the ore to pulverulent form, concentrating the ore to remove impurities, sintering the concentrate to form an agglomerated mass of the corresponding metallic oxide and reducing the metallic oxide in a blast furnace to the elemental metal. The sintering step is usually performed on an apparatus known in the art as the Dwight and Lloyd sintering machine.

The Dwight and Lloyd machine provides an endless moving grate similar to a conveyor belt, upon which a pulverulent layer of ore concentrates containing sulfidic metal travels. At one end of the machine there is an ignition chamber in which the sulfidic content of the concentrate is ignited. Air and fuel is blown downwardly through the concentrate to initiate combustion at the lower surface of an ignition layer of concentrate. The main feed layer of concentrate is added on top of the ignited ignition layer and the combination is conveyed by the grate to a sintering zone wherein air is blown upwardly therethrough to support the combustion of the sulfur containing compounds. The gas coming off the upper portion of the sintering zone is rich in sulfur dioxide content and may be supplied to a sulfuric acid plant as a feed material.

The concentrate is burned in the sintering zone until the flame breaks through its upper surface, at which point a maximum temperature is reached and most of the sulfur has been burned off as sulfur dioxide. The burning step agglomerates the concentrate into a cogent mass, generally known in the art as a sinter strand (hereinafter referred to as "strand").

The strand leaving the sintering zone is transported by the grate to a cooling zone located adjacent to and downstream from the sintering zone. A stream of cooling gas is blown through the strand and is collected in a hood disposed above the grate. After cooling, the strand is physically reduced, fines are returned to the ignition chamber and the coarse sinter is fed to a blast furnace for reduction of the metal oxides to elemental metal.

Since some burning of the strand continues downstream of the sintering zone, the exhaust gas from the cooling zone can contain sulfur dioxide. However, the exhaust gas from the cooling zone is too lean in $SO_2$ content to be supplied to a sulfuric acid plant and has been discharged into the atmosphere or treated to remove $SO_2$.

Accordingly, it is an objective of the invention to provide a sintering method and apparatus that greatly reduces the emission of $SO_2$ to the atmosphere and ideally eliminates $SO_2$ emissions. It is a further objective of the invention to provide a sintering method and apparatus wherein a substantial portion of the heat generated is recovered, resulting in lower fuel consumption for the industrial installation in which it is utilized. Still further, it is an objective of the invention to concentrate substantially all of the evolved $SO_2$ into a single gas stream for use as feed to a sulfuric acid plant. These and further objectives and advantages of the invention will become apparent to one skilled in this art as the description of the invention proceeds.

DISCLOSURE STATEMENT

Sintering methods and apparatus using the Dwight and Lloyd machine or variations thereof and employing updraft sintering are described in the following patents: Burrow et al U.S. Pat. No. 2,672,412 and Cunningham U.S. Pat. No. 3,649,244. Burrow et al includes a disclosure of the recirculation of a portion of the off gases and combining the recirculated gas with air and combustion gases from the ignition zone. The gas mixture is then forced through the sinter bed. The Cunningham patent teaches a three zone system wherein there is a sintering zone, a densifying zone with no flow of gas through the sinter strand and a cooling zone.

The following patents deal with downdraft sintering methods and apparatus including recirculation of at least a portion of the off gases: Powers U.S. Pat. No. 3,963,481; Ban U.S. Pat. No. 3,909,189; Cappel U.S. Pat. No. 4,067,727 and Seidel U.S. Pat. No. 4,023,960. Powers teaches downdraft sintering and updraft cooling with recirculation of the cooling off gas to the sintering gas inlet with the objective of filtering dust from the gas. Similarly, the Cappel patent teaches gas recirculation of off gases from an intermediate cooling zone to a sintering zone with the objective of removing dust from the gas stream. The Ban patent discloses a downdraft sintering machine for iron ore that recycles a portion of a relatively cool draft to a downstream cooling zone to reduce the content of hydrocarbons in the sinter exhaust gas. Seidel discloses a sintering system including ignition, sintering and burning zones wherein off gases from the burning zone are recirculated to the sintering zone, passed through the sinter charge and subsequently scrubbed.

A printed publication pertaining to updraft sintering with recirculation of off gases is entitled "The New Updraft Sintering Installation of the Binsfeldhammer Lead Smelter of the Stolberger Zink A.G.". Schmidt R et al. Erzbergban u. Metallhüttenw, 11 301–310 (1958). This article contains a detailed description of the operation of an updraft sintering machine, the feed materials therefore and the control thereof. FIG. 6 discloses recirculation of off gases from both the ignition zone and intermediate cooling zone, to the sintering zone.

Another publication pertaining to an updraft sintering system of the foregoing type is "Gas Recirculation in Sintering of Lead and Zinc Concentrates", by M. O. Peucker et al, Sintering Symposium, Port Pirie, South Australia, September 1958 Austro-Asian Institute of Mining and Metallurgy, pp. 261-284. This article specifically proposes a gas recirculation system in a zinc or lead sintering machine as shown in FIG. 3 and FIG. 6 and described in the related textual material.

The following patents disclose various control systems for sintering machines: Miyakawa et al U.S. Pat. No. 3,211,441; Cappel et al. U.S. Pat. No. 4,065,295; Schütz et al. U.S. Pat. No. 3,399,053; Schuerger et al. U.S. Pat. No. 3,194,546. Miyakawa controls the speed of the ore feeder by sensing temperature and pressure at various points. Cappel et al controls the speed of the machine as a function of the temperature of the off gases. Similarly, Schütz et al continuously senses the temperature of the off gas at various points and continually adjusts the speed of the machine to obtain a desired temperature profile. The Schuerger et al patent provides for automatic control of the sinter mix feed rate and the grate speed by use of a burn through indicator.

SUMMARY OF THE INVENTION

According to the invention, a method for cooling a sintered strand from a first temperature to a second and lower temperature, is provided. The new method includes the steps of continuously supplying the strand to a primary cooling zone, blowing a gaseous stream having a third temperature less than the initial strand temperature through the strand in the primary cooling zone, removing the gaseous stream from the primary cooling zone, cooling the removed gaseous stream to a temperature less than the temperature of the gaseous stream entering the primary cooling zone, continuously supplying the strand to a secondary cooling zone, blowing the cooled gaseous stream through the strand in the secondary cooling zone, removing the gaseous stream from the secondary cooling zone, and supplying the removed gaseous stream to the primary cooling zone.

In accordance with a specific aspect of the invention, the cooling stream of gases blown through the sintered strand in two adjacent cooling zones is totally recycled between the two cooling zones. A cooling step, which preferably includes an interchange of heat between a process stream in the plant and the cooling gases from the primary cooling zone, is interposed between the gas outlet from the first cooling zone and the gas inlet to the secondary cooling zone. The cooling step is regulated to reduce the temperature of the gas leaving the primary cooling zone below the temperature of the cooling gas entering the primary cooling zone.

The recuperative heat exchange involved in the cooling of the gas stream exhausted from the primary cooling zone may involve any liquid or gaseous process stream in the plant that requires heating and can take place in a conventional heat exchanger apparatus. The recuperative heat exchange provides a substantial benefit to the plant since the fuel normally used to heat the process stream is conserved. Preferably, the heated process stream can be the air supply to a blast furnace in the proximity of the sintering machine.

In accordance with a further specific aspect of the invention, an improved sintering machine of the type hereinbefore described is provided. The sintering machine includes a sintering zone and at least primary and secondary cooling zones, a first windbox means for supplying a gas to the lower portion of the primary cooling zone, second windbox means for supplying a gas to the lower portion of the secondary cooling zone, first hood means for removing gas from the upper portion of the primary cooling zone, and second hood means for removing gas from the upper portion of the secondary cooling zone. The improvement of the invention comprises recirculating means including a first conduit means communicating with the first hood means and the second windbox means, second recirculating means including second conduit means communicating with the second hood means and the first windbox means, the first recirculating means including gas cooling means disposed in the first conduit means.

Preferably, the method and apparatus of the invention may include a third cooling zone, sometimes referred to as a final cooling zone, disposed adjacent to and downstream from the secondary cooling zone. Atmospheric air is blown through the sintered strand in the final cooling zone, and all of the exhaust gases therefrom may be recirculated to the gas inlet of the sintering zone.

As described above, the only gaseous stream leaving the sintering apparatus is the exhaust gas from the sintering zone, which is rich in sulfur dioxide, i.e. at least 4% and preferably about 6% or more, and is an ideal feed material to a sulfuric acid plant which may be and typically is located in close proximity to the sintering machine.

All percentages specified herein are weight percentages when referring to solids or liquids and volume percentages when referring to gases.

In accordance with a further specific aspect of the invention, control means may be provided to insure that the burn through point of the sintered material is within the sintering zone of the new apparatus. Pursuant to this aspect of the invention, the control means includes a plurality of temperature measurement sites in the downstream portion of the sintering zone and upstream portion of the primary cooling zone, to determine the point of maximum temperature of the evolved gases, and means responsive to the gas temperature for either increasing or decreasing the rate at which the grate and strand travel through the sintering machine. Preferably the burn through point is immediately adjacent the downstream end of the sintering zone.

The control means is based on the principle, to be explained in more detail hereinafter, that the burn through point is the point of maximum temperature in the exhaust gas and that substantially all of the sulfitic content of the feed material is evolved before this point as sulfur dioxide. In response to the movement of the maximum gas temperature point downstream of the sintering zone, the speed of the motor driving the grate is decreased resulting in the strand moving through the machine at a slower rate. Conversely, in response to the maximum gas temperature point moving upstream from the juncture of the sintering zone and first cooling zone, the speed of the motor driving the grate is increased, resulting in the strand moving through the machine at a faster rate.

A further aspect of the control means provides for regulating the amount of air supplied to the sintering zone in response to the temperature of the evolved gas at the downstream side of the last cooling zone. Pursuant to this aspect of the invention, it has been found that if the exhaust gas at the extreme downstream side of the last cooling zone, i.e. at the point where the strand leaves the machine, is too high, the sintered strand is red hot and molten lead might separate out. Accordingly, means may be provided for increasing the air (oxygen) supply to the sintering zone in response to too high a final gas temperature to more efficiently burn the sulfitic content of the feed in the sintering zone and maximize the cooling effect of the cooling zones.

BRIEF DESCRIPTION OF THE DRAWING

The invention will be described in further detail with reference to the accompanying drawing in which.

DETAILED DESCRIPTION

Figure 1:
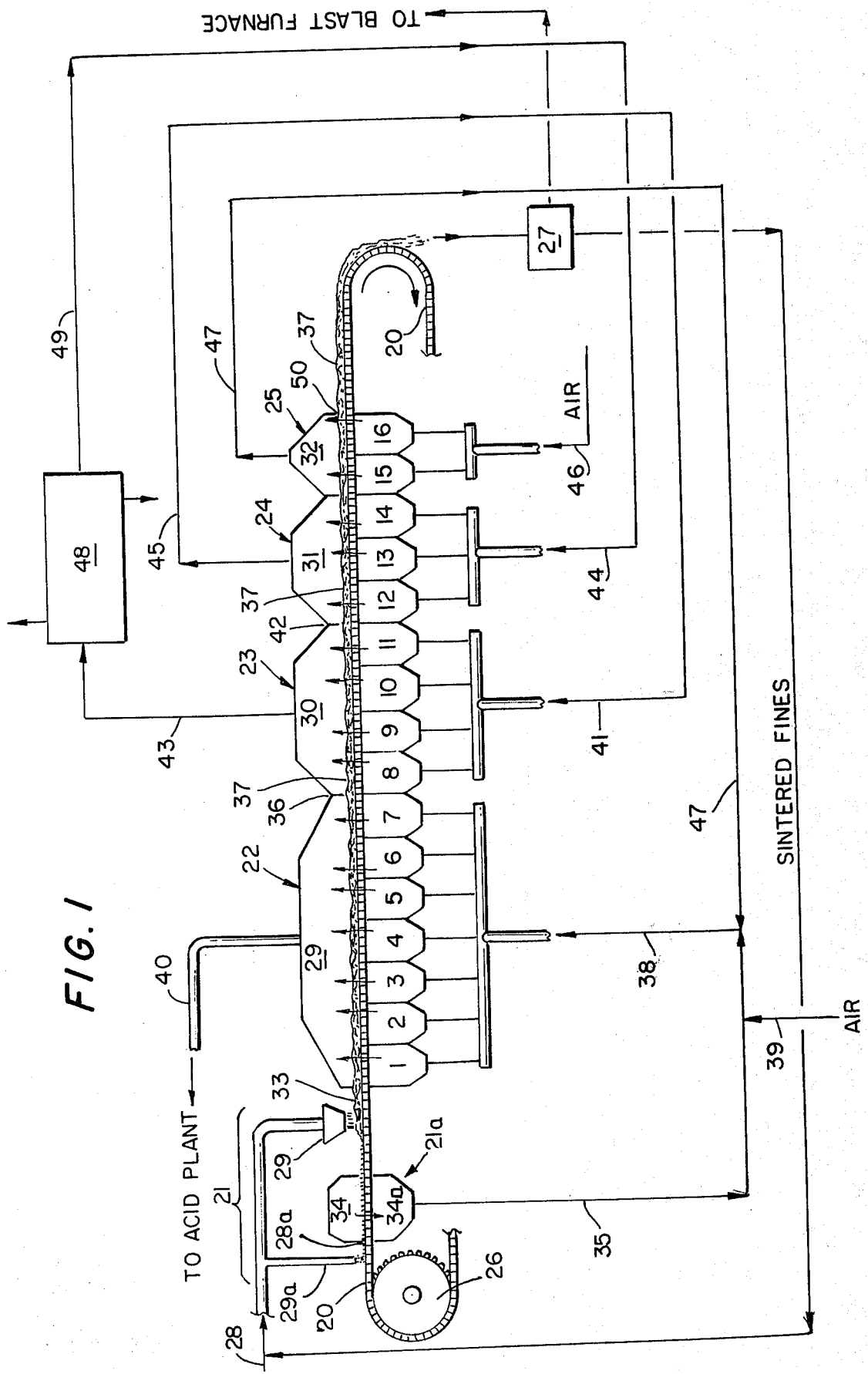
FIG. 1 is a schematic diagram showing a sintering system employing the invention.

Referring to FIG. 1, a sintering machine for eliminating the sulfidic content of lead concentrates by burning off the sulfur as $SO_2$ gas is shown. The sintering machine of FIG. 1 includes a moving, endless grate 20 that extends through an ignition zone 21, a sintering zone 22, a primary cooling zone 23, a secondary cooling zone 24 and a final cooling zone 25.

The grate 20 is composed of a series of interconnected pallets having an open structure to permit the flow of gas therethrough; however the open structure is dense enough to support the particulate lead concentrate feed. The grate 20 is transported through the various zones of the machine by drive means 26 which has means such as sprockets for engaging and moving the grate 20 at a predetermined rate. The drive means 26 is driven by a variable speed motor (see FIG. 5).

The grate 20 and associated drive means 26 function as a continuous conveyor system for transporting lead concentrate feed from the ignition zone 21 through the final cooling zone 25. After passage through the final cooling zone the lead concentrate, in the form of a continuous, agglomerated strand containing lead oxides and about 1 to 2% sulfur, is removed from the grate 20 and physically reduced in size by a suitable grinding apparatus 27.

The particulate units of agglomerated sinter which are primarily lead oxide are fed to a lead blast furnace (see FIG. 4) wherein the lead oxide is reduced to metallic lead. The fines produced by the grinding apparatus 72 are recirculated and combined with the new feed stream 28 to form the lead concentrate feed.

The new feed stream 28 is composed of lead concentrate and various fluxes such as lime ($Ca_2O_3$), silica, etc. The lead concentrate is primarily lead sulfide (PbS) and lead sulfate ($PbSO_4$) and is derived from lead ore that has been ground to the desired particulate size and concentrated to remove gangue materials. The new feed stream 28 typically has a sulfur content from about 10 to 18%, which is diluted to form 5 to 8% preferably 6–7% sulfur when combined with the recirculated fines. The fines are typically supplied in the amount of 100% to 300% of the new feed stream 28 depending upon the sulfur content of the new feed stream.

The combined new feed stream 28 and recirculated fines, herein referred to as the lead concentrate feed, is uniformly deposited onto grate 20 in two steps within the ignition zone 21. The first step, which is upstream of the furnace 34, deposits an ignition layer 28a of lead concentrate feed onto the grate 20 by supply conduit 28a. The ignition layer 28a, which is typically about 1" thick, is fed into the furnace 34. A fuel, typically natural gas, and air are fed to and burned in the furnace 34 and the downdraft ignition gas passes through the ignition layer 28a and into downdraft windbox 34a, from which they are removed as gas stream 35. The ignition layer 28a is ignited as it passes through the furnace 34.

The main charge of lead concentrate feed is supplied to the grate 20 downstream of the furnace 34 through supply hopper 29. The weight ratio of the main charge of lead concentrate feed to the ignition layer 28a is preferably about 17:1, i.e. the feed layer 33 to the sintering zone 22 is about 18" thick. As shown in FIG. 1, the main charge is applied directly on top of the burning ignition layer 28a and is thereby ignited to form the ignited feed layer 33.

Still referring to FIG. 1, each of the sintering zone 22, primary cooling zone 23, secondary cooling zone 24 and final cooling zone 25 includes a plurality of updraft windboxes 1–16 disposed below the grate 20, and a hood section 29–32 disposed about the grate 20. The hood sections are partitioned from each other to minimize the leakage of gas between them and receive gases blown upwardly through the grate by the respective windboxes. The partitions between hood sections terminate before the grate 20 to permit a layer of sinter material to pass from one zone to the next downstream zone.

The ignited feed layer 33 is transported to the sintering zone 22 wherein it is supplied with oxygen by an updraft flow of an air enriched gas from windboxes 1–7 into hood 29. As the layer 33 progresses through sintering zone 22 the burn line moves upward from the bottom of the layer 33 towards the top and, ideally, breaks through the upper surface of the layer 33 at point 36 (See FIGS. 1 and 2). This point is generally known in the art as the "burn through point". For maximum efficiency of the system the burn through point should be located at the terminal portion of the sintering zone 22 and immediately prior to the start of the primary cooling zone. The sintering zone functions to burn off a substantial portion of the sulfitic content of the layer 33 as $SO_2$, which is evolved into hood 29, and forms agglomerated layer 37 known in the art as a "sinter strand".

The gas stream 38 supplied to the layer 33 through windboxes 1–7 includes the downdraft ignition gas from stream 35 and air from outside the system through stream 39 and/or recirculated, heated air from the final cooling zone 25 through gas stream 47. The temperature of gas stream 38 is typically from about 150°–300° F.

The gas stream 38 is forced through the layer 33 via windboxes 1–7 and supports combustion of the sulfidic content of the layer 33. The gas stream 38 is exhausted into hood 29 with the $SO_2$ resulting from the oxidation of the sulfur compounds. In accordance with the invention, the amount of gas supplied in stream 38 is determined to provide sufficient oxygen to support combustion; however the gas velocity through layer 33 should be less than about 150 feet/minute* to avoid a physical disruption of the layer 33. The evolved gases are removed from hood 29 as gas stream 40 which is relativey high in $SO_2$ content and can be supplied to an acid plant for conversion to sulfuric acid.

*As used herein, gas velocities are standard feet per minute, calculated by dividing the volume of gas per minute at standard conditions, (Scfm) by the surface area (ft$^2$) of the grate 20, through which that volume of gas has passed, i.e. Scfm/ft$^2$.

Figure 2:
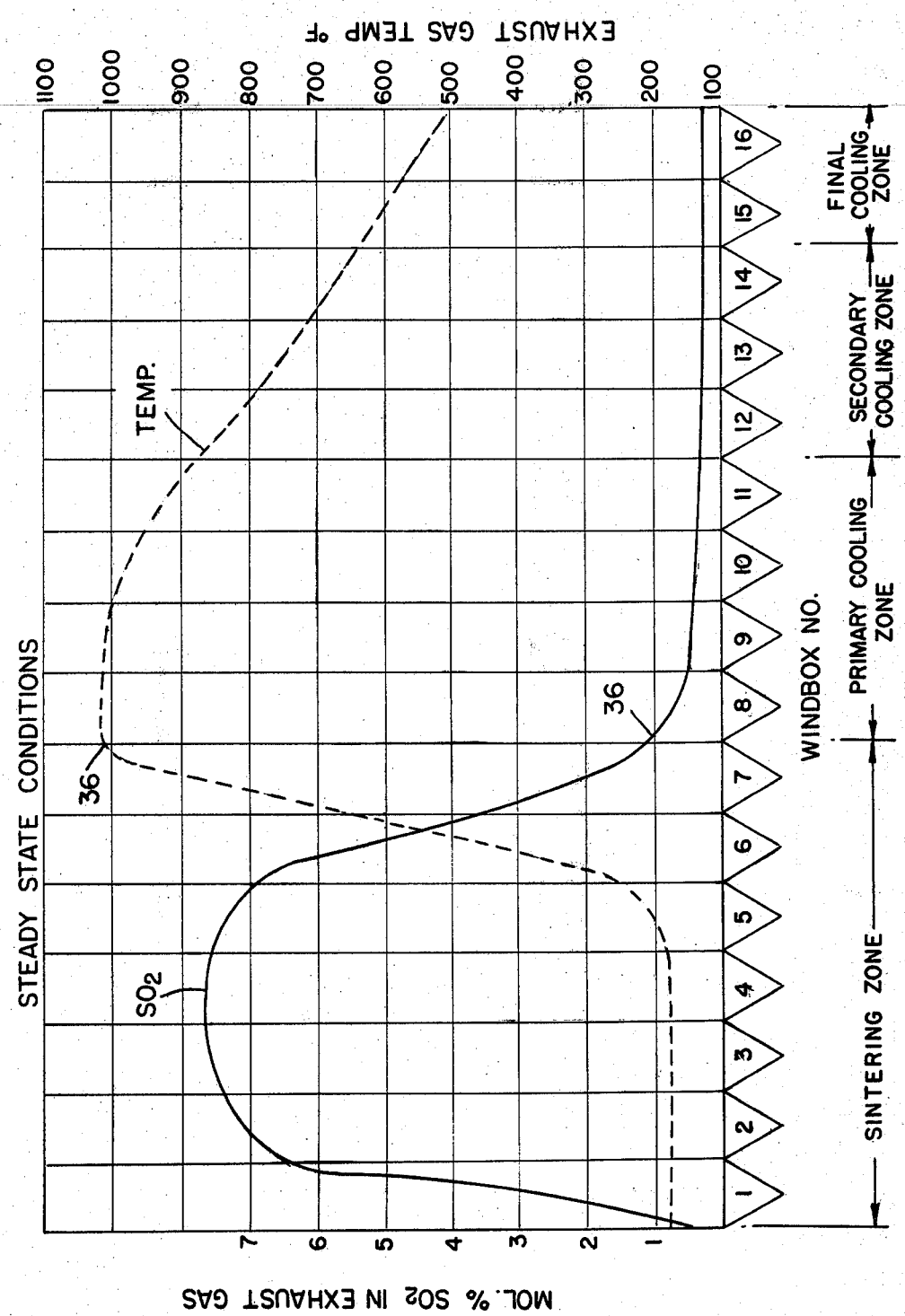
FIG. 2 is a graphical representation of the exhaust gas during operation of the system of FIG. 1.

As shown in FIG. 2, the temperature of the exhaust gas from the sintering zone remains about constant at less than 200° F. until windbox 5. From windbox 5–7 there is a rapid increase in the gas temperature to about 1000° F. The maximum temperature of the evolved gases occurs at point 36, which corresponds to the burn through point.

The evolution of $SO_2$ from the layer 33 is shown by the solid curve of FIG. 2. The evolution of $SO_2$ increases to about windbox number 4 at which point it reaches a maximum and thereafter decreases. At the end of the sintering zone, $SO_2$ evolution is about 2% of the exhaust gas and decreases through the cooling zones to about 0.25% of the exhaust gas in the secondary and final cooling zones.

According to a specific aspect of the invention, the operation of the sintering machine in accordance with the principles described herein results in the concentration of the $SO_2$ gas in a single $SO_2$ rich gas stream 40. The gas stream 40 contains about 6 or more percent $SO_2$ and is a suitable feed stream for a sulfuric acid plant. As will be explained in further detail as the description continues, the gas stream 40, is the sole gas stream leaving the improved sintering system and there is no discharge of process gas to the atmosphere, although, as shown in FIG. 2 the evolved gas from the downstream cooling zones contains from about 2% to about 0.25% $SO_2$.

It should also be understood that because of the suction applied to hood 29 to remove gas stream 40 there is a small upstream flow of process gas under the baffles between the hoods from the downstream cooling zones 23, 24, 25 to the sintering zone 22. This upstream flow of process gas prevents a build up during recirculation and results in a substantially constant volume of recirculated gas during steady state operation of the new sintering machine.

From the sintering zone 22, the strand 37 enters the primary cooling zone 23 wherein the strand is cooled by an exchange of heat with a cooling gas stream 41 which is forced through the sinter (and supporting grate) via updraft windboxes 8–11. The term "primary" is used to define the first cooling zone and is not meant to imply that the strand must be cooled more in that zone than in any other zone, although that is usually the case.

To achieve its function, the cooling gas stream 41 must be at a lower temperature than the temperature of the strand 37 as it enters the zone 23, i.e. at point 36. The temperature of the strand 37 at the terminus of the zone 23 is, of course, a function of the flow rate and temperature of cooling gas stream 41.

The temperature of the cooling gas stream 41 is typically about 600° F. The flow rate of cooling gas stream 41 is adequate to cool the strand to the desired temperature at point 42 and to result in a gas velocity through the sinter of less than 150 feet per minute typically about 50–100 feet per minute. The cooling gas stream 41 is collected in hood 30 and is removed from hood 30 as gas stream 43.

The strand 37 leaves the primary cooling zone 23 and enters the secondary cooling zone 24 wherein it is further cooled by heat exchange with a cooling gas stream 44 which is blown through strand 37 via windboxes 12–14. The cooling gas stream 44 is typically at a temperature from about 350° F. and is blown through the strand 37 at a velocity less than 150 feet per minute, typically about 50–100 feet per minute. The cooling gas stream 44 is collected in hood 31 and removed therefrom as gas stream 45 at a temperature of about 600° F.

As will be explained in further detail hereinafter, the final cooling zone 25 is optional. When the final cooling zone 25 is not employed, the temperature and flow rate of cooling gas stream 44 is adjusted accordingly and the number of updraft windboxes in secondary cooling zone 24 is determined so that the final temperature of the gas leaving the strand 37 is about 500° F.

When the final cooling zone 25 is employed, according to a preferred embodiment of the invention, a stream 46 of ambient air (70° F.) is blown through the sinter strand 37 via windboxes 15 and 16. The cooling gas stream 46 is collected in hood 32 and is removed as gas stream 47 at a temperature of about 500° F. The flow rate of cooling gas stream 46 is adequate to provide the desired cooling effect but should be selected to provide a gas velocity through the sinter bed of about 100 feet per second.

According to a specific aspect of the invention, the velocity of the gas pressing through the concentrate 33 and sinter strand 37 should be less than about 150 feet per minute. If higher than the aforementioned value, the physical integrity of the concentrate layer or strand might be disrupted and a major objective of the system, i.e. to produce a continuous agglomerated strand, might not be achieved. Too high a gas velocity could blow holes through the layer 33 or strand 37. Of course, this problem decreases as the strand progresses downstream and is particularly acute in the sintering zone 22. Preferably the gas velocity through the concentrate layer 33 and strand 37 in zones 22–25 is in the range of 50 ft./min. to about 150 ft./min., most preferably about 75–100 ft./min.

GAS RECIRCULATION

According to an important aspect of the invention, only a single gas stream 40, which is rich in $SO_2$, leaves the new sintering system and is fed to an acid plant wherein the $SO_2$ is converted to $H_2SO_4$. The remaining exhaust gas streams, i.e 43, 45 and 47 are recirculated in their entirety within the system to avoid the discharge of $SO_2$ or other undesirable pollutants to the atmosphere. Accordingly, a significant characteristic of the new system is the absence of any process gas discharge to the atmosphere.

Figure 3:
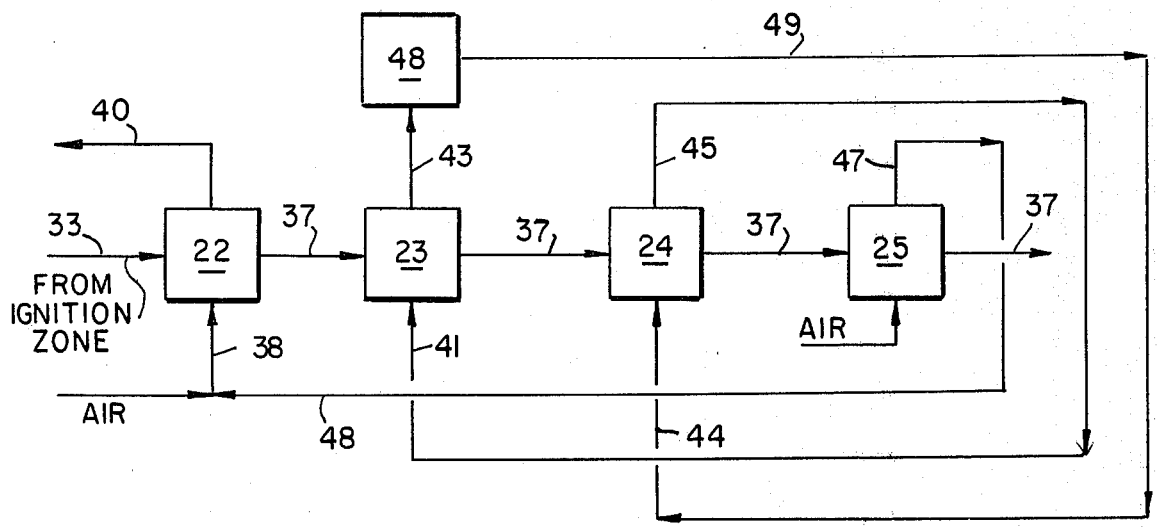
FIG. 3 is a block diagram showing the gas recirculation system of the invention.
Figure 4:
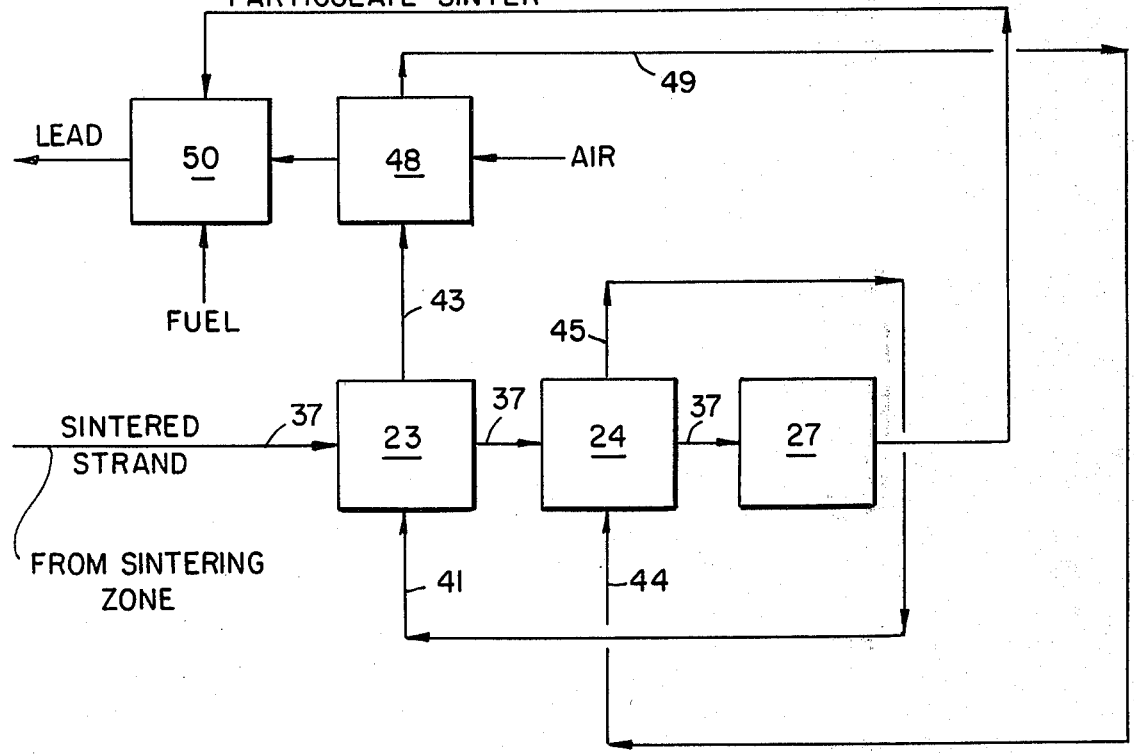
FIG. 4 is a block diagram showing a further gas recirculation system of the invention.

In accordance with this aspect of the invention, and as shown in FIGS. 1, 3 and 4 of the drawing, the exhaust gas stream 43 from hood 30, which has a temperature of about 800° F., is supplied to a heat exchanger 48 wherein it is cooled to a temperature of about 350° F. and leaves as gas stream 49. Preferably, the heat removed from gas stream 43 in heat exchanger 48 is utilized to conserve energy in the plant by heating a process stream that would otherwise be heated by another source of energy. Pursuant to this aspect of the invention, and as shown in FIG. 4, the heat exchanger 48 is used to preheat the combustion air stream to the lead blast furnace 50 that is typically associated with a lead sintering machine. The lead blast furnace functions to reduce the lead oxide of the sinter feed to metallic lead, which is recovered and further processed for ultimate sale to customers. Typically, the blast furnace air stream is preheated in heat exchanger 48 to about 500°–700° F.

According to the invention, 100% of the gas stream 43 is cooled and is recirculated to the secondary cooling zone. As shown in the drawings, the gas stream 43 leaves heat exchanger 48 as gas stream 49 which is supplied to the secondary cooling zone 24 as gas stream 44 via updraft windboxes 12–14. In further accordance with this aspect of the invention, the exhaust gas stream 45 is totally recirculated and is supplied to primary cooling zone 23 as gas stream 41 via updraft windboxes 8–11.

From the foregoing description, it is seen that the invention provides for as close to 100% recirculation of the cooling gases supplied to the primary and secondary cooling zones 23 and 24 as is possible in an industrial installation of this type. As previously mentioned, there may be a minor "leakage" of process gas from the cooling zones to the sintering zone. Typically, the volume of this "leakage" is made up by the minor amounts of $SO_2$ gas evolved in the cooling zones. Accordingly, as used herein, the term "100% recirculation" should be interpreted in light of the foregoing factors.

The cooling gas stream 41 leaves the primary cooling zone, is cooled and becomes the supply gas stream to the secondary cooling zone. Similarly, the cooling gas stream 44 leaves the secondary cooling zone, is recirculated, and becomes the supply gas stream to the primary cooling zone. By providing for total recirculation of the cooling gas streams 41 and 44, no $SO_2$ bearing process gas is discharged from the system, thereby solving a serious air pollution problem usually encountered in a sintering plant of this type. The gas streams 43 and 45 are lean in $SO_2$ content and cannot be supplied to the acid plant along with the rich $SO_2$ gas stream 40 without adversely effecting the efficiency of the acid plant.

In further accordance with the invention and as shown in FIGS. 1 and 3, the exhaust gas from the final cooling zone 25 is recirculated to the sintering zone 22 and forms a component of gas stream 38. Since recirculated gas stream 47 is substantially all air, it supplements the fresh air supply to gas stream 38. Any $SO_2$ contained in gas stream 47 is evolved in gas stream 40.

SINTERING CONTROL

According to a further specific aspect of the invention, control means are provided to maintain the burn through point of the sinter at point 36, i.e. at the termination of the sintering zone 22. The burn through point 36 defines the terminal point of significant sulfidic burning and the evolution of substantial amounts of $SO_2$ in the process gas. Accordingly, in order to maximize the $SO_2$ content of gas stream 40, it is important that the burn through point be kept on the upstream side of the primary cooling zone 23. The $SO_2$ content of the gas stream 40 is thereby kept at greater than 4% and preferably greater than 6% which is a suitable feed stream for an $H_2SO_4$ plant. As previously stated and as shown in FIG. 2, the location of the burn through point is manifested by a maximum temperature of the evolved gas leaving the sinter strand 37. Accordingly, this aspect of the invention provides for a control mechanism to insure that the point of maximum evolved gas temperature is maintained substantially at point 36.

Further, it has been discovered that the amount of fresh air supplied to the sintering zone 22 can be regulated as a function of the evolved gas temperature at point 50. In the event the temperature of the exhaust gas at the end of the last cooling zone, typically the final cooling zone 25, is greater than about 600° F., in conjunction with a gas velocity through the sinter strand 37 of less than about 150 feet per minute (which defines the amount of cooling gas supplied to the strand), the strand will be at too high a temperature upon leaving the machine, with the possibility of precipitation of molten lead. Accordingly, and pursuant to the invention, the amount of air supplied to the sintering zone, which controls the rate of combustion of the sulfitic content of the concentrate cam be controlled in response to the gas temperature at point 50.

Figure 5:
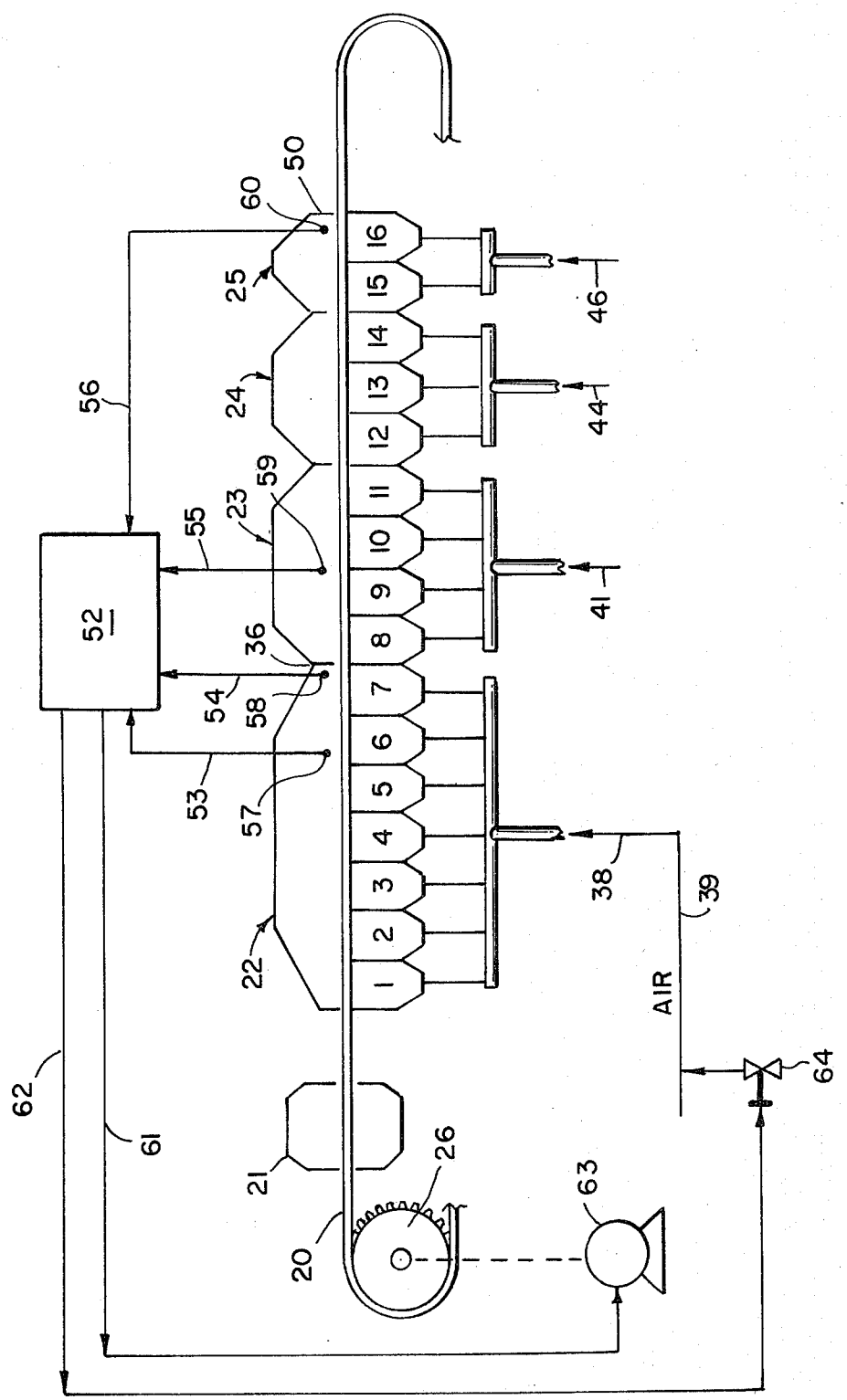
FIG. 5 is a schematic diagram showing the control system of the invention.

Referring to FIG. 5, the sinter control system of the invention is shown. A control terminal 52 is provided with inputs 53, 54, 55 and 56 from temperature probes 57, 58, 59 and 60 and outputs 61 and 62 to motor 63 and valve 64. The temperature probe 57 continuously measures the temperature of the evolved gas in the vicinity of windbbox 6 and continuously relays this information to the control terminal 52. Similarly, temperature probe 58 continuously measures the temperature of the evolved gas in the vicinity of windbox 6 and continuously relays this information to the control terminal 52. Similarly, temperature probe 58 continuously measures the temperature of the evolved gas in the vicinity of windbox 6 and continuously relays this information to the control terminal 52. Similarly, temperature probe 58 continuously measures the temperature of the evolved gas in the vicinity of windbox 7 adjacent the end of sintering zone 22 and continuously relays this information to control terminal 52. A temperature probe 59 is disposed within the primary cooling zone 23 to continuously measure the evolved gas temperature in the vicinity of windbox 8. The temperature measurements of probe 59 are continuously relayed to control terminal 52, wherein a continuous plot of the temperatures from probes 57–59 is made. This plot is similar to the portion of the temperature curve of FIG. 2 between windboxes 6–8.

The control means 52 is programmed to activate motor 63 in response to a temperature measurement of probe 57 or probe 59 that is greater than the temperature measurement of probe 58. For example, in response to a higher temperature at point 57 than point 58, the motor 63 is activated via output 61 to increase the rotational speed of drive means 26 through signal 65. This results in the grate 20 moving at a faster rate and a movement of the maximum temperature point downstream from probe 57 toward probe 58 and point 36. Similarly, in the event the temperature measured by probe 59 is greater than the temperature measured by probe 58, the motor 63 is activated via output 61 to decrease the rotational speed of drive means 26. This results in a decrease in the rate of travel for grate 20 and an upstream movement of the maximum temperature point from probe 59 toward probe 58 and point 36.

The net result of the control of the rate of travel of grate 20 as a function of evolved gas temperature is to maintain the burn through point substantially at point 36 and thereby concentrate evolved $SO_2$ in gas stream 40 for subsequent conversion to $H_2SO_4$ in the acid plant.

In accordance with a further aspect of the invention a temperature probe 60 is provided adjacent point 50 to continuously or periodically measure the temperature of the evolved gas in the downstream section of the final cooling zone 25. The measured temperature is relayed to control terminal 52. Control terminal 52 is programmed to regulate the air supply valve 64 via output 62 as a function of the temperature measured by probe 60. Accordingly, in response to a temperature measurement by probe 60 above about 600° F. the flow of air through valve 64 is increased to increase the efficiency of the burning step in the sintering zone 22. However, the maximum temperature point is maintained at point 36 by control terminal 52 as set forth in the preceding description and the burn through point is kept within the sintering zone. From the foregoing, it is apparent that the purpose of temperature probe 60 and the related control functions is to avoid too high an outlet temperature for the sintered strand. In this regard, it has been found that if the sintered strand leaving the sintering machine is too hot, i.e. cherry red, the subsequent size reduction operation in apparatus 27 can be adversely affected. The specified and measured temperature of about 600° F. for the evolved gas at probe 60 is based on an air velocity through the sinter strand 37 in final cooling zone of about 150 feet per minute.

Although the invention has been described in relation to a specific system, it should be realized that changes and modification can be made without departing from the spirit of the invention. Accordingly, reference should be made to the following claims to determine the scope of the invention.

I claim:

1. A process for cooling a sintered strand including metallic oxides from a first predetermined temperature to a second predetermined temperature comprising the steps of (a) continuously supplying said strand to a primary cooling zone, (b) blowing a gaseous stream which has a third predetermined temperature less than said first predetermined temperature through said strand in said primary cooling zone, said blowing step heating said gaseous stream to a fourth predetermined temperature, (c) removing said gaseous stream from said primary cooling zone, (d) cooling said removed gaseous stream to a fifth predetermined temperature, said fifth predetermined temperature being less than said third predetermined temperature, (e) continuously supplying said strand to a secondary cooling zone, (f) blowing said cooled gaseous stream through said strand in said secondary cooling zone, (g) removing said gaseous stream from said secondary cooling zone, (h) supplying said removed gaseous stream from said secondary cooling zone to said primary cooling zone and (i) any additional cooling being through the repeating of steps (a) to (i); whereby all the gases are substantially maintained within the cooling zone apparatus.

2. The process of claim 1 wherein said gaseous stream is blown through said strand at a velocity less than about 150 feet per minute.

3. The process of claim 1 wherein said third predetermined temperature is about 600° F.

4. The process of claim 1 wherein said fourth predetermined temperature is about 800° F.

5. The process of claim 1 wherein said fifth predetermined temperature is about 450° F.

6. The process of claim 1 wherein said step of cooling said removed gas includes the simultaneous heating of an air stream.

7. A process for sintering sulfidic ore concentrates comprising sequentially providing a continuous moving strand of said concentrates to an ignition zone, a sintering zone, a primary cooling zone, a secondary cooling zone, and a final cooling zone; igniting said concentrates in said ignition zone; burning the sulfidic content of said concentrates in said sintering zone and cooling said strand in said primary, intermediate and final cooling zones; supplying first, second, third and fourth gas streams to said sintering, primary cooling, secondary cooling and final cooling zones respectively; removing fifth, sixth, seventh and eighth gas streams from said sintering, primary, secondary and final cooling zones respectively; cooling said sixth gas stream to a temperature less than the temperature of said second gas stream; recirculating said cooled sixth gas stream to said third gas stream, recirculating said seventh gas stream to said second gas stream, and combining said eighth gas stream with said first gas stream.

8. The process of claim 7 wherein said fifth gas stream is rich in $SO_2$ relative to said sixth, seventh and eighth gas streams.

9. The process of claim 8 wherein said fifth gas stream contains at least 4 percent $SO_2$.

10. The process of claim 7 wherein said sintered strand is removed from said final cooling zone, reduced to particulate form and supplied to a blast furnace.

11. The process of claim 10 wherein fines produced in reducing said sinter to particulate form are recirculated to said ignition zone.

12. The process of claim 7 further including the step of controlling the rate of travel of said concentrates to maintain a point of maximum temperature for the evolved gases in said sintering zone.

13. The process of claim 12 wherein said point of maximum temperature is maintained immediately upstream from said primary cooling zone.

14. The process of claim 7 wherein an oxygen containing gas stream is supplied to said ignition zone and the amount of oxygen in said stream is controlled in response to the temperature of said fourth gas stream.

15. A process for sintering sulfidic ore concentrates comprising sequentially providing a continuous moving strand of said concentrates to an ignition zone, a sintering zone, a primary cooling zone, a secondary cooling zone, and a final cooling zone; igniting said concentrates in said ignition zone; burning the sulfidic content of said concentrates in said sintering zone and cooling said strand in said primary, intermediate and final cooling zones; supplying first, second, third and fourth gas streams to said sintering, primary cooling, secondary cooling and final cooling zones respectively; removing fifth, sixth, seventh and eighth gas streams from said sintering, primary, secondary and final cooling zones respectively; cooling said sixth gas stream; recirculating said cooled sixth gas stream as 100% of said third gas stream, combining said seventh gas stream with said second gas stream, and combining said eighth gas stream with said first gas stream.

16. A process for sintering sulfidic ore concentrates comprising sequentially providing a continuous moving strand of said concentrates to an ignition zone, a sintering zone, a primary cooling zone, a secondary cooling zone, and a final cooling zone; igniting said concentrates in said ignition zone; burning the sulfidic content of said concentrates in said sintering zone and cooling said strand in said primary, intermediate and final cooling zones; supplying first, second, third and fourth gas streams to said sintering, primary cooling, secondary cooling and final cooling zones respectively; removing fifth, sixth, seventh and eighth gas streams from said sintering, primary, secondary and final cooling zones respectively; cooling said sixth gas stream; combining said cooled sixth gas stream with said third gas stream, recirculating said seventh gas stream as 100% of said second gas stream, and combining said eighth gas stream with said first gas stream.

17. A process for sintering a continuous moving strand of sulfidic ore concentrates comprising the sequential steps of:

(a) igniting said concentrates in an ignition zone;
(b) burning the sulfidic content of said concentrates in a sintering zone including supplying a first gas stream at a first predetermined temperature to said sintering zone;

(c) cooling strand in a primary cooling zone including supplying a second gas stream at a second predetermined temperature and removing said second gas stream from said primary cooling zone at a third predetermined temperature;
(d) further cooling said strand in a secondary cooling zone including supplying a third gas stream at a fourth predetermined temperature and removing said third gas stream from said secondary cooling zone at a fifth predetermined temperature;
(e) cooling said second gas stream after removal from said primary cooling zone from said third predetermined temperature to a temperature less than said second predetermined temperature;
(f) recirculating said second gas stream to said secondary cooling zone; and
(g) recirculating said third gas stream after removal from said secondary cooling zone to said primary cooling zone.

* * * * *